(12) United States Patent
Byun

(10) Patent No.: US 6,297,815 B1
(45) Date of Patent: Oct. 2, 2001

(54) DUTY CYCLE ALTERATION CIRCUIT

(75) Inventor: Ho-Jin Byun, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/997,619

(22) Filed: Dec. 23, 1997

(30) Foreign Application Priority Data

Dec. 23, 1996 (KR) .................................................. 96-70507

(51) Int. Cl.[7] .................................................. G09G 5/00
(52) U.S. Cl. .............................. 345/212; 345/213; 345/99
(58) Field of Search ................................ 345/99, 10–29, 345/102, 211–213; 313/364, 339; 348/797

(56) References Cited

U.S. PATENT DOCUMENTS

| Re. 35,428 | 1/1997 | Wilhelm . | |
|---|---|---|---|
| 3,733,435 | * 5/1973 | Chodil et al. | 348/797 |
| 4,149,111 | * 4/1979 | Coates, Jr. | 345/63 |
| 4,726,658 | 2/1988 | Nishimura et al. . | |
| 4,823,250 | 4/1989 | Kolecki et al. . | |
| 5,008,563 | 4/1991 | Kenney et al. . | |
| 5,144,207 | 9/1992 | Brunson . | |
| 5,179,693 | 1/1993 | Itamura et al. . | |
| 5,418,707 | 5/1995 | Shimer et al. . | |
| 5,438,292 | 8/1995 | Tadokoro . | |
| 5,528,111 | 6/1996 | Konopka et al. . | |
| 5,568,044 | 10/1996 | Bittner . | |
| 5,627,437 | * 5/1997 | Kim | 315/399 |
| 5,844,540 | * 12/1998 | Terasaki | 345/102 |
| 5,920,309 | * 7/1999 | Bisset et al. | 345/173 |

* cited by examiner

*Primary Examiner*—Steven Saras
*Assistant Examiner*—Amr Awad
(74) *Attorney, Agent, or Firm*—Robert E. Bushnell, Esq.

(57) ABSTRACT

A duty cycle alteration circuit can simply alter a duty cycle of a pulse by using a Schmitt circuit in a monitor. The duty cycle alteration circuit includes: a microcomputer for outputting a waveform amplifying ratio control signal; an amplifying circuit for inputting and amplifying the waveform amplifying ratio control signal outputted by the microcomputer or a triangular wave and for outputting an amplified triangular wave; and a Schmitt circuit for establishing a logic "high" level and a logic "low" level centering around a reference level according to the amplified triangular wave supplied from the amplifying circuit and for changing a duty cycle on the basis of the logic "high" and "low" levels and for outputting a rectangular wave having an altered duty cycle.

8 Claims, 4 Drawing Sheets

DUTY CYCLE ALTERATION CIRCUIT

CLAIM OF PRIORITY

This application makes reference to, incorporates the same herein, and claims all benefits accruing under 35 U.S.C. §119 from an application for DUTY ALTERATION CIRCUIT earlier filed in the Korean Industrial Property Office on the Dec. 23, 1996 and there duly assigned Ser. No. 70507/1996.

BACKGROUND OF THE INVENTION

1. Field of the Invention

The present invention relates to a duty cycle alteration circuit, and more particularly, to a duty cycle alteration circuit for a monitor which can simply alter a duty cycle of a pulse by using a Schmitt circuit.

2. Discussion of Related Art

Generally, if a high voltage change is generated on a monitor in accordance with variation of horizontal and vertical frequencies for synchronizing a video signal outputted from a computer, a part or the entire screen of the monitor is distorted. To solve the partial or entire screen distortion, it should be expected that a novel monitor has a high voltage change which is less sensitive to the variation of frequency.

A representative duty cycle alteration circuit for avoiding the partial or entire screen distortion is classified into a horizontal duty cycle alteration circuit which senses a change of a secondary side load of a transformer in a monitor power circuit and adjusts a duty cycle according to the sensed change of the load and a duty cycle alteration circuit which has a large current variation according to a load change and senses the large current variation from a horizontal output transistor.

In the horizontal duty cycle alteration circuit, a horizontal phase size is large, if a beam current generated by a secondary side winding of a flyback transformer(FBT) is large, and contrarily, the horizontal phase size is constant, if the beam current is small.

Further, in the horizontal duty cycle alteration circuit, if the voltage supplied to the FBT is varied, a high voltage variation ratio of the FBT is great and simultaneously the voltage supplied to the screen is varied. At the time, if the voltage supplied to the screen and the voltage induced from the FBT are lowered, the brightness of the screen is darkened. Particularly, if the voltage supplied to a contrast resistor is varied, the variation of the brightness of a back raster is extremely great.

In more detail, as the variation of the brightness on the screen of a low voltage of video signal increases, degradation of a quality of image occurs. Moreover, since the horizontal duty cycle alteration circuit is designed to sense the secondary side current of the FBT generated due to the variation of load and to adjust the duty cycle by feeding back the sensed signal, there occurs a problem in that a response speed to the sensed signal fed back is slow.

In an earlier duty cycle control circuit, data is processed and outputted from a computer as a video signal through a video card which outputs the video signal as a horizontal synchronous signal and a vertical synchronous signal to display it on a monitor screen.

The horizontal synchronous signal and the vertical synchronous signal outputted from the video card are inputted to a microcomputer within a monitor. The microcomputer executes a previously stored microcomputer control program and then outputs the horizontal and vertical synchronous signals and a horizontal size signal. The horizontal synchronous signal and the vertical synchronous signals outputted from the microcomputer are supplied to a horizontal and vertical oscillation signal processor in which a reference oscillation signal and the horizontal and vertical oscillation signals are supplied to thereby bandwidth compensate and correct linearity.

A horizontal drive circuit to which the horizontal oscillation signal is supplied from the horizontal and vertical oscillation signal processor supplies a sufficient current to drive a horizontal output circuit. The horizontal output circuit causes a sufficient deflection current to flow a horizontal deflection yoke. As a result, the application of the sufficient deflection current enables the horizontal deflection yoke to synchronize the video signal displayed on the monitor.

On the other hand, a horizontal size controller to which the horizontal size signal outputted from the microcomputer is supplied, controls the horizontal size signal to output a horizontal size adjusting signal which is supplied to a horizontal size drive circuit in which the supplied horizontal size adjusting signal is fully amplified and outputted.

The horizontal size adjusting signal outputted from the horizontal size drive circuit is supplied to a horizontal regulation controller. A regulation sensor senses the variation of a sawtooth current outputted from the horizontal output circuit and the regulation sensor supplies the sensed variation signal of the sawtooth current to the horizontal regulation controller. Then, the horizontal regulation controller inputs the horizontal size adjusting signal outputted from the horizontal size drive circuit and outputs a control signal according to the variation signal of the sawtooth current.

The control signal outputted from the horizontal regulation controller is supplied to a horizontal regulation output circuit which supplies a pulse according to the applied control signal to the horizontal output circuit to thereby stabilize the sawtooth current outputted from the horizontal output circuit. As a result, the horizontal phase size displayed on the monitor screen is constantly maintained.

Since the earlier duty cycle alteration circuit however utilizes a complicated pulse width modulation integrated circuit and peripheral circuits, there is a problem in that the circuit construction is complicated.

The following patents each disclose features in common with the present invention but do not teach or suggest the specifically recited duty cycle alteration circuit of the present invention: U.S. Pat. No. Re. 35,428 to Wilhelm, entitled Electronic Rheostat Method And Apparatus, U.S. Pat. No. 5,568,044 to Bittner, entitled Voltage Regulator That Operates In Either PWM Or PFM Mode, U.S. Pat. No. 5,528,111 to Konopka et al., entitled Ballast Circuit For Powering Gas Discharge Lamp, U.S. Pat. No. 5,179,693 to Kitamura et al., entitled System For Controlling Operation Of Processor By Adjusting Duty Cycle Of Performance Control Pulse Based Upon Target Performance Value, U.S. Pat. No. 5,418,707 to Shimer et al., entitled High Voltage DC-DC Converter With Dynamic Voltage Regulation And Load-Generated Arcs, U.S. Pat. No. 5,144,207 to Brunson, entitled Circuit And Method For Igniting And Operating An Arc Lamp, U.S. Pat. No. 4,823,250 to Kolecki et al., entitled Electronic Control For Light Weight, Portable X-Ray System, U.S. Pat. No. 5,438,292 to Tadokoro, entitled Schmitt Trigger Circuit With CMOS Inverters And Filtering Means, U.S. Pat. No. 5,008,563 to Kenney et al., entitled Adjustable Clock Generator Circuit, and U.S. Pat. No. 4,726,658 to Nishimura et al., entitled Effective Value Voltage Stabilizer For A Display Apparatus.

SUMMARY OF THE INVENTION

Accordingly, the present invention is directed to a duty cycle alteration circuit that substantially obviates one or more of the problems due to limitations and disadvantages of the related art.

An object of the invention is to provide a duty cycle alteration circuit for a monitor which can simply alter a duty cycle of a pulse by using a Schmitt circuit.

Another object of the invention is to provide a horizontal duty cycle alteration circuit for a display having a simple duty cycle alteration circuit construction.

To accomplish these and other objects of the present invention, there is provided a duty cycle alteration circuit including: a direct current level adjusting circuit for inputting a waveform amplifying ratio control signal according to a horizontal size adjusting signal supplied from a microcomputer and for converting the waveform amplifying ratio control signal into a direct current signal; an integrating circuit for inputting a rectangular wave or a flyback pulse, generated within a monitor and charged and discharged in accordance with the supplied rectangular wave or the flyback pulse, to generate a triangular wave; an amplifying circuit for inputting and amplifying the waveform amplifying ratio control signal or the triangular wave from the direct current level adjusting circuit or the integrating circuit to thereby output an amplified triangular wave; and a Schmitt circuit for establishing a logic "high" level and a logic "low" level centering around a reference level according to the amplified triangular wave supplied from the amplifying circuit and for changing a duty cycle on the basis of the logic "high" and "low" levels to thereby output a rectangular wave having an altered duty cycle.

It is to be understood that both the foregoing general description and the following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
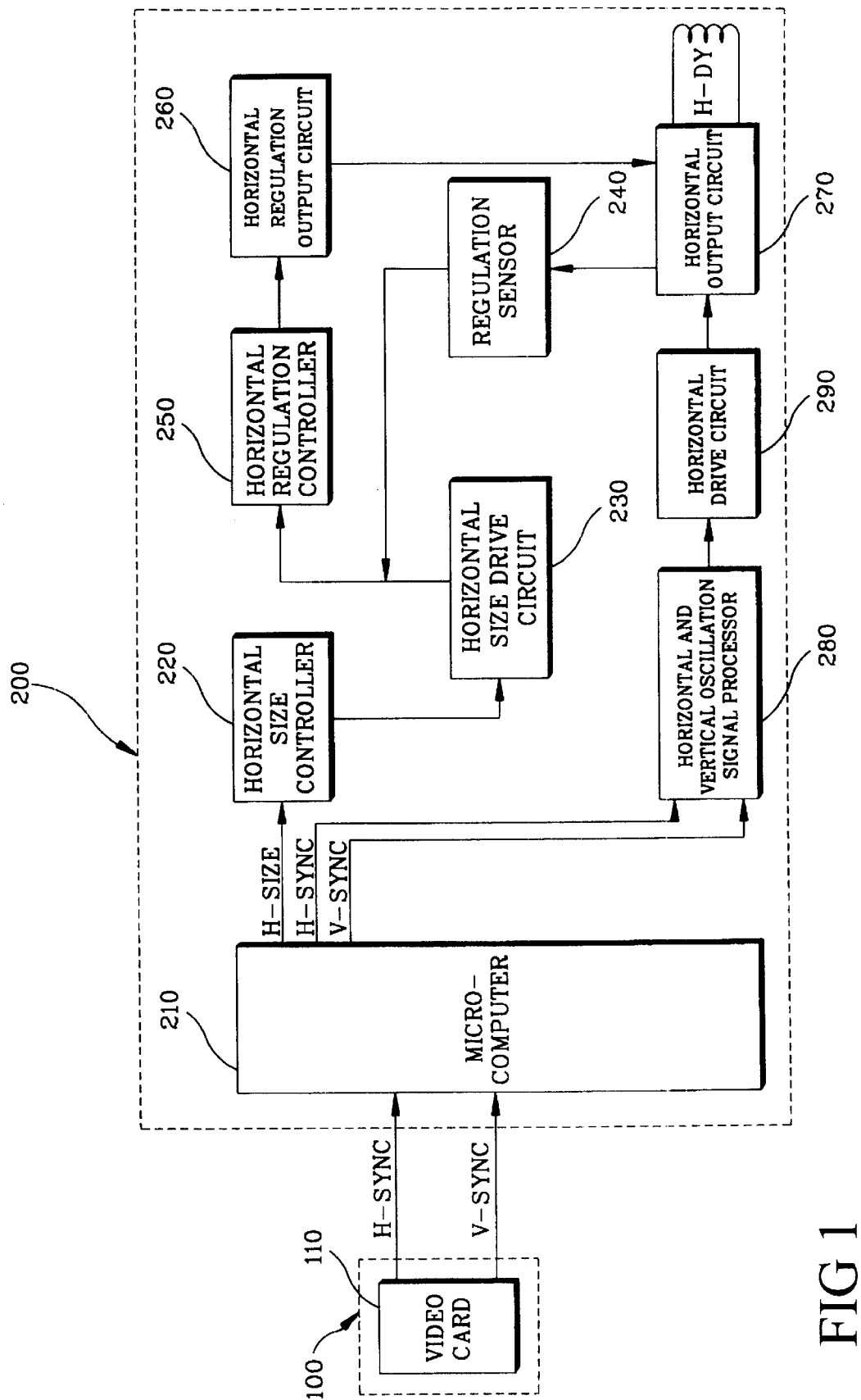
FIG. 1 is a block diagram illustrating a construction of an earlier duty cycle control circuit.

FIG. 1 shows a block diagram for construction of an earlier duty cycle control circuit.

Data processed and outputted from a computer 100 is processed as a video signal through a video card 110, which outputs the video signal as a horizontal synchronous signal H-SYNC and a vertical synchronous signal V-SYNC to display it on a monitor screen.

The horizontal synchronous signal H-SYNC and the vertical synchronous signal V-SYNC outputted from the video card 110 are inputted to a microcomputer 210 within a monitor 200. After inputting the horizontal synchronous signal H-SYNC and the vertical synchronous signal V-SYNC, the microcomputer 210 executes a previously stored microcomputer control program and then outputs the horizontal synchronous signal H-SYNC, the vertical synchronous signal V-SYNC and a horizontal size signal H-SIZE. The horizontal synchronous signal H-SYNC and the vertical synchronous signal V-SYNC outputted from the microcomputer 210 are supplied to a horizontal and vertical oscillation signal processor 280, in which a reference oscillation signal and the horizontal and vertical oscillation signals are supplied to thereby bandwidth compensate and correct linearity.

A horizontal drive circuit 290 to which the horizontal oscillation signal is supplied from the horizontal and vertical oscillation signal processor 280 supplies a sufficient current to drive a horizontal output circuit 270. The horizontal output circuit 270 causes a sufficient deflection current to flow a horizontal deflection yoke H-DY. As a result, the application of the sufficient deflection current enables the horizontal deflection yoke H-DY to synchronize the video signal displayed on the monitor 200.

On the other hand, a horizontal size controller 220, to which the horizontal size signal H-SIZE outputted from the microcomputer 210 is supplied, controls the horizontal size signal H-SIZE to thereby output a horizontal size adjusting signal. The horizontal size adjusting signal is supplied to a horizontal size drive circuit 230, in which the supplied horizontal size adjusting signal is fully amplified and outputted.

The horizontal size adjusting signal outputted from the horizontal size drive circuit 230 is supplied to a horizontal regulation controller 250. A regulation sensor 240 senses the variation of a sawtooth current outputted from the horizontal output circuit 270.

The regulation sensor 240 supplies the sensed variation signal of the sawtooth current to the horizontal regulation controller 250. Then, the horizontal regulation controller 250 inputs the horizontal size adjusting signal outputted from the horizontal size drive circuit 230 and outputs a control signal according to the variation signal of the sawtooth current.

The control signal outputted from the horizontal regulation controller 250 is supplied to a horizontal regulation output circuit 260, which supplies a pulse according to the supplied control signal to the horizontal output circuit 270, to thereby stabilize the sawtooth current outputted from the horizontal output circuit 270. As a result, the horizontal phase size displayed on the monitor screen is constantly maintained.

Since the earlier duty cycle alteration circuit, however, utilizes a complicated pulse width modulation(PWM) integrated circuit(IC) and additional peripheral circuits, there is a problem in that the circuit construction is complicated.

Figure 2:
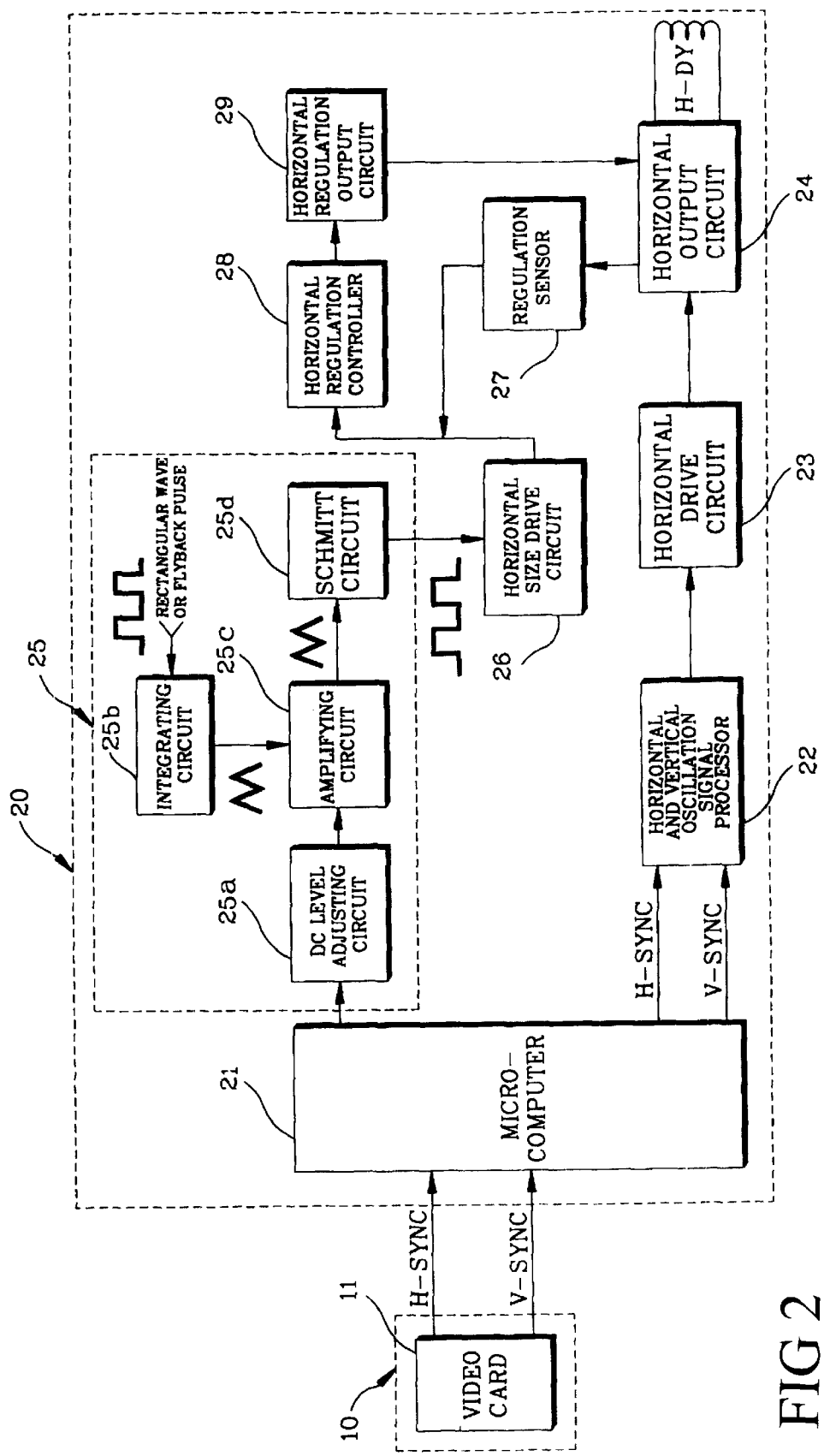
FIG. 2 is a block diagram illustrating an internal circuit of a monitor in which a duty cycle alteration circuit constructed according to the present invention is embodied.

FIG. 2 is a block diagram illustrating an internal circuit of a monitor in which a duty cycle alteration circuit constructed according to the present invention is embodied. In construction, there are provided a video card 11 which processes data processed and outputted from a computer 10 as a video signal and outputs the video signal as a horizontal synchronous signal H-SYNC and a vertical synchronous signal V-SYNC for synchronizing the processed video signal; a microcomputer 21 which inputs the horizontal synchronous signal H-SYNC and the vertical synchronous signal V-SYNC outputted from the video card 11 to discriminate a video mode and outputs a waveform amplifying ratio control signal according to a horizontal size adjusting signal, based upon the discriminated video signal; a horizontal and vertical oscillation signal processor 22 which inputs the horizontal and vertical synchronous signals H-SYNC and V-SYNC outputted from the microcomputer 21 and the horizontal and vertical oscillation signals to thereby bandwidth compensate and correct linearity; a horizontal drive circuit 23 which inputs the horizontal oscillation signal supplied from the horizontal and vertical oscillation signal processor 22 to supply a sufficient current to a horizontal output circuit 24; the horizontal output circuit 24 which is operated by the application of the sufficient current from the horizontal drive circuit 23 to produce a sufficient sawtooth current; a duty cycle alteration circuit 25 which inputs and amplifies the waveform amplifying ratio control signal according to a horizontal size adjusting signal outputted from the microcomputer 21 to thereby output a rectangular wave with an altered duty cycle; a horizontal size drive circuit 26 which inputs the rectangular wave outputted from the duty cycle alteration circuit 25 and fully amplifies the inputted rectangular wave; a regulation sensor 27 which senses the variation of a sawtooth current outputted from the horizontal output circuit 24 and outputs the sensed variation signal of the sawtooth current; a horizontal regulation controller 28 which inputs the sensed variation signal of the sawtooth current outputted from the regulation sensor 27 and inputs the horizontal drive signal outputted from the horizontal size drive circuit 26 to thereby stabilize an output waveform of the sawtooth current; a horizontal regulation output circuit 29 which the horizontal size adjusting signal outputted from the horizontal regulation controller 28 to control an output of the horizontal output circuit 24; and a horizontal deflection yoke H-DY which inputs the sawtooth supplied from the horizontal output circuit 24 which is controlled by the horizontal regulation output circuit 29 to thereby synchronize the video signal supplied from the video card 11.

Under the above construction, the duty cycle alteration circuit 25 is preferably comprised of: a direct current(DC) level adjusting circuit 25a for inputting the waveform amplifying ratio control signal according to the horizontal size adjusting signal supplied from the microcomputer 21 and for converting the waveform amplifying ratio control signal into a DC signal; an integrating circuit 25b for inputting a rectangular wave or a flyback pulse, generated within a monitor 20 and charged and discharged in accordance with the supplied rectangular wave or the flyback pulse, to generate a triangular wave; an amplifying circuit 25c for inputting and amplifying the waveform amplifying ratio control signal or the triangular wave from the direct current level adjusting circuit 25a or the integrating circuit 25b to thereby output an amplified triangular wave; and a Schmitt circuit 25d for establishing a logic "high" level and a logic "low" level centering around a reference level according to the amplified triangular wave supplied from the amplifying circuit 25c and for changing a duty cycle on the basis of the logic "high" and "low" levels to thereby output a rectangular wave with an altered duty cycle.

In operation, the computer 10 processes data processed by execution of a program as a video signal through the video card 11, which outputs the video signal as the horizontal synchronous signal H-SYNC and the vertical synchronous signal V-SYNC for synchronizing the video signal. The horizontal synchronous signal H-SYNC and the vertical synchronous signal V-SYNC outputted from the video card 11 are inputted to the microcomputer 21 within the monitor 20. After inputting the horizontal synchronous signal H-SYNC and the vertical synchronous signal V-SYNC, the microcomputer 21 discriminates a video mode and a polarity. Based upon the discriminated result, the microcomputer 21 outputs the waveform amplifying ratio control signal according to a horizontal size adjusting signal, that is, outputs a pulse width modulation adjusting level signal.

The microcomputer 21 supplies the horizontal synchronous signal H-SYNC and the vertical synchronous signal V-SYNC supplied from the video card 11 to the horizontal and vertical oscillation signal processor 22, which bandwidth compensates and corrects linearity according to the horizontal and vertical oscillation signals.

The horizontal drive circuit 23 to which the horizontal oscillation signal is supplied from the horizontal and vertical oscillation signal processor 22 supplies a sufficient current to drive the horizontal output circuit 24. The horizontal output circuit 24 produces a sawtooth current. If an overload occurs in the horizontal output circuit 24, the regulation sensor 27 senses the generated overload.

On the other hand, the waveform amplifying ratio control signal according to the horizontal size adjusting signal supplied from the microcomputer 21 is supplied to the DC level adjusting circuit 25a. The waveform amplifying ratio control signal is supplied to a digital to analog converter(not shown), in which the control signal is converted into an analog level signal.

As a result, the waveform amplifying ratio control signal is converted through the digital to analog converter into a triangular wave. The outputted triangular wave is converted to the DC through the DC level adjusting circuit 25a and then amplified by the amplifying circuit 25c. Meanwhile, the integrating circuit 25b, which inputs a rectangular wave or a flyback pulse generated within the monitor 20, converts the inputted rectangular wave or the flyback pulse into a triangular wave.

The converted triangular wave is amplified by the amplifying circuit 25c, and then input to the Schmitt circuit 25d. The Schmitt circuit 25d establishes the logic "high" level and the logic "low" level centering around the reference level according to the amplified triangular wave supplied from the amplifying circuit 25c and changes a duty cycle on the basis of the logic "high" and "low" levels to thereby output a rectangular wave with an altered duty cycle.

The altered duty cycle rectangular wave is supplied to the horizontal size drive circuit 26, in which the altered duty cycle rectangular wave is fully amplified and outputted.

The rectangular waves outputted from the horizontal size drive circuit 26 and the regulation sensor 27 and the overload sensing signal generated by the horizontal output circuit 24 are supplied to the horizontal regulation controller 28, which supplies a compensating signal according to the rectangular wave and the overload sensing signal to the horizontal output circuit 24 through the horizontal regulation output circuit 29.

The horizontal output circuit 24, which inputs the compensating signal supplied from the horizontal regulation output circuit 29, corrects the generated overload state to supply a stabilized sawtooth wave to the horizontal deflection yoke H-DY. The horizontal deflection yoke H-DY generates a sawtooth current to thereby synchronize the video signal.

Figure 3:
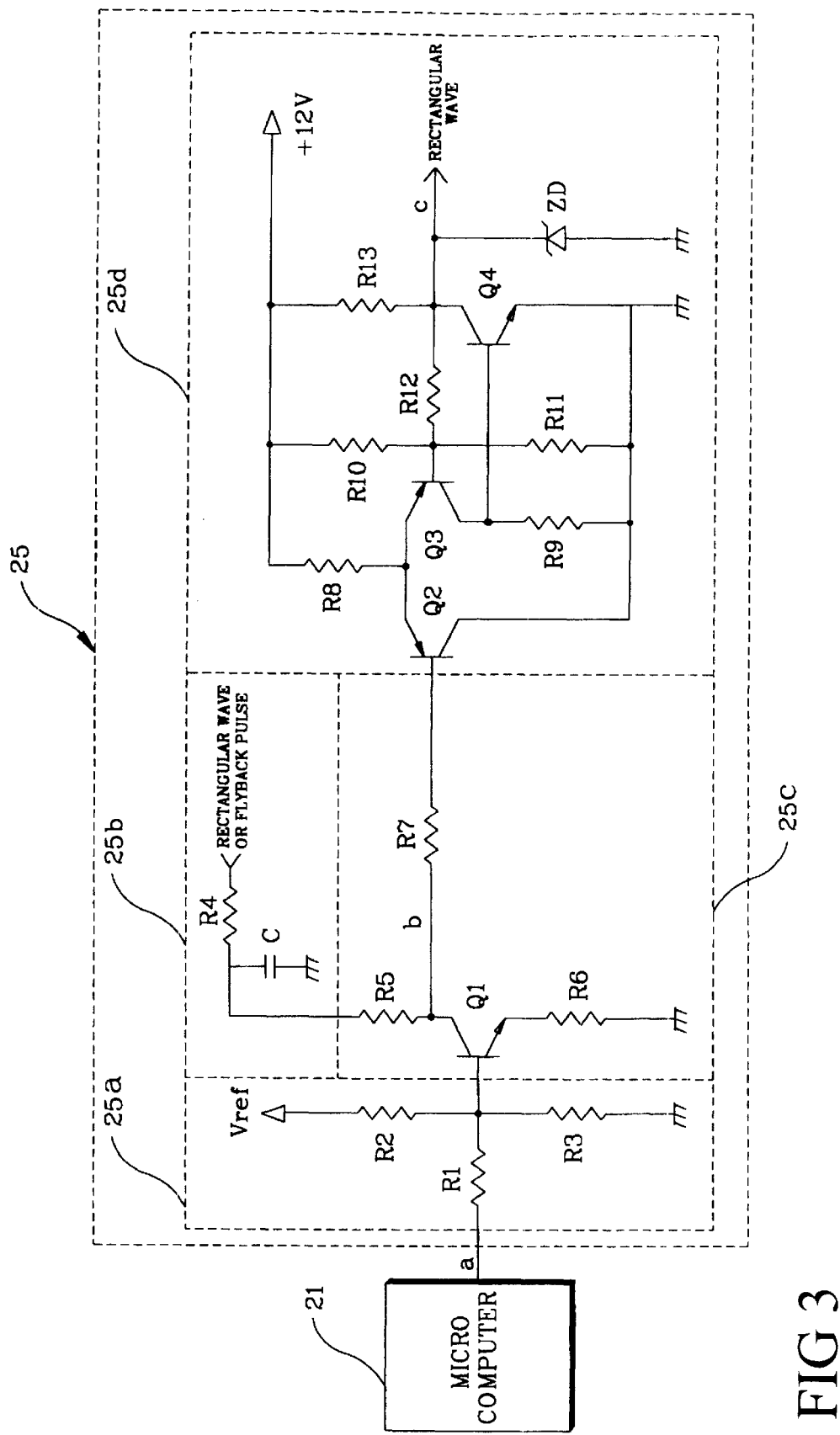
FIG. 3 is a detailed circuit diagram illustrating the duty cycle alteration circuit of FIG. 2.

FIG. 3 is a detailed circuit diagram illustrating the duty cycle alteration circuit 25 of FIG. 2.

As shown in FIG. 3, the microcomputer 21, which inputs the horizontal synchronous signal H-SYNC and the vertical synchronous signal V-SYNC outputted from the video card 11, discriminates the video mode and outputs the waveform amplifying ratio control signal according to the horizontal size adjusting signal, based upon the discriminated video signal.

The DC level adjusting circuit 25a, which inputs the waveform amplifying ratio control signal according to the horizontal size adjusting signal supplied from the microcomputer 21 to convert the control signal into the DC signal, is comprised of two resistors R2 and R3 which voltage-divides the waveform amplifying ratio control signal according to the horizontal size adjusting signal and a single resistor R1.

The integrating circuit 25b, which inputs the rectangular wave or the flyback pulse generated within the monitor 20 and is charged and discharged in accordance with the supplied rectangular wave or the flyback pulse to generate a triangular wave, is comprised of a capacitor C and a resistor R4 in which the rectangular wave or the flyback pulse is changed into a triangular wave according to an RC time constant.

The amplifying circuit 25c, which inputs and amplifies the waveform amplifying ratio control signal or the triangular wave from the direct current level adjusting circuit 25a or the integrating circuit 25b to thereby output an amplified triangular wave, is comprised of a transistor which amplifies the waveform amplifying ratio control signal or the triangular wave and a plurality of resistors R5 to R7.

Finally, the Schmitt circuit 25d, which establishes the logic "high" level and the logic "low" level centering around a reference level according to the amplified triangular wave supplied from the amplifying circuit 25c and changes a duty cycle on the basis of the logic "high" and "low" levels to thereby output an altered duty cycle rectangular wave, is comprised of a plurality of transistors Q2 to Q4, a plurality of resistors R8 to R13, and a Zener diode ZD.

In operation, the microcomputer 21, which inputs the horizontal synchronous signal H-SYNC and the vertical synchronous signal V-SYNC outputted from the video card 11, discriminates the video mode to thereby output a horizontal size adjusting signal according to the discriminated video signal. The outputted horizontal size adjusting signal outputted from the microcomputer 21 corresponds to the waveform amplifying ratio control signal, that is, the pulse width modulation level signal.

The waveform amplifying ratio control signal is applied to the DC level adjusting circuit 25a within the duty cycle alteration circuit 25, in which the waveform amplifying ratio control signal is induced through the resistor R1 and is adequately voltage-divided according to a reference voltage $V_{ref}$ supplied from the resistors R2 and R3 to be outputted as the DC signal. A DC level is adjusted and outputted in accordance with resistance values of the reference voltage $V_{ref}$ and the resistors R2 and R3.

The waveform amplifying ratio control signal in which the DC level is adjusted is supplied to a base terminal of the transistor Q1 within the amplifying circuit 25c. Meanwhile, the transistor Q1 inputs the triangular wave supplied to a collector terminal thereof and amplifies the triangular wave according to the waveform amplifying ratio control signal to thereby output the amplified triangular wave.

On the other hand, the integrating circuit 25b may be additionally installed to generate the triangular wave by using the rectangular wave or the flyback pulse. The integrating circuit 25b generates the rectangular wave or the flyback pulse as the triangular wave in accordance with the RC time constant of the resistor R4 and the capacitor C.

The generated triangular wave is input by the resistor R5 of the transistor Q1 within the amplifying circuit 25c and is then supplied to the collector terminal thereof. The supplied triangular wave is amplified by the waveform amplifying ratio control signal supplied to the base terminal of the transistor Q1 and is outputted as the logic "high" level signal. The outputted triangular wave is output by the resistor R7 and is then supplied to the Schmitt circuit 25d.

The Schmitt circuit 25d supplies the supplied triangular wave to a base terminal of the transistor Q2 and induces a driving voltage of +12V through the resistor R8 to supply the driving voltage to the emitter terminals of the transistors Q2 and Q3. The transistors Q2 and Q3 are turned on and off according to a rising time and a falling time of the supplied triangular wave and change the duty cycle of the triangular wave according to the logic "high" and "low" levels established previously.

The output signal from the transistors Q2 and Q3 is supplied to a base terminal of the transistor Q4 to which a driving voltage of +12V, input through a resistor R13, is supplied. The transistor Q4 amplifies the output signal from the transistors Q2 and Q3 to produce a rectangular wave. The output of the rectangular wave is stabilized through the feedback of the resistor R12.

The rectangular wave fed back through the resistor R12 is voltage-divided through the resistors R10 and R11 and is then supplied to the base terminal of the transistor Q3. By using such a feedback loop, the altered duty cycle rectangular wave outputted from the transistor Q4 is outputted in a stable state. The resistor R9 is a collector resistor of the transistor Q3, and the Zener diode ZD maintains the output of the rectangular wave at a constant level.

Figure 4A:
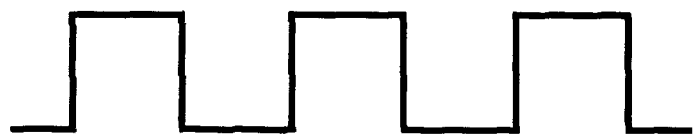
FIGS. 4A–4C are waveform diagrams illustrating waveforms from output points of respective circuits of FIG. 3.
Figure 4B:
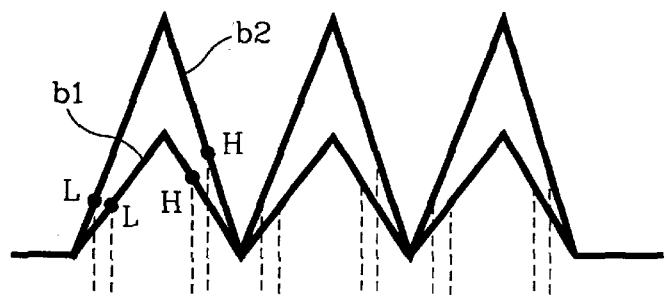
Figure 4C:
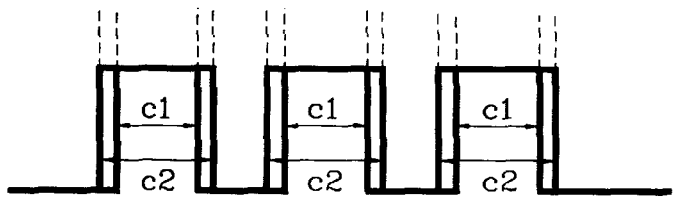

FIGS. 4A–4C are waveform diagrams illustrating waveforms from output points of respective circuits of FIG. 3.

FIG. 4A shows a waveform which is generated at an output point "a" of FIG. 3, and which represents a waveform of the waveform amplifying ratio control signal according to the horizontal size adjusting signal. FIG. 4B shows a waveform which is generated at an output point "b" of FIG. 3 and which represents a waveform of the triangular wave converted in the integrating circuit 25b. Waveforms "b1" and "b2" are generated by a potential level difference.

The duty cycle width of the pulse in the FIG. 4B is changed through the Schmitt circuit 25d. In other words, the output waveform according to the logic "low" level and the logic "high" level of the waveform "b1" corresponds to a pulse duty cycle width of "c1" in the waveform of FIG. 4C. The output waveform according to the logic "low" level and the logic "high" level of the waveform "b2" corresponds to a pulse duty cycle width of "c2" in the waveform of FIG. 4C. Accordingly, the width of the duty cycle can be changed through the Schmitt circuit 25d in accordance with the waveform amplifying ratio control signal.

As previously discussed above, a duty cycle alteration circuit according to the present invention can simply alter a duty cycle of a pulse by using a Schmitt circuit in a monitor.

It will be apparent to those skilled in the art that various modifications and variations can be made in a duty cycle alteration circuit of the present invention without departing from the spirit or scope of the invention. Thus, it is intended that the present invention cover the modifications and variations of this invention provided they come within the scope of the appended claims and their equivalents.

What is claimed is:

1. A duty cycle alteration circuit in a monitor, comprising:
   a microcomputer for outputting a waveform amplifying ratio control signal;
   an amplifying circuit for inputting and amplifying one of said waveform amplifying ratio control signal outputted from said microcomputer and a triangular wave input from an integrating circuit in response to a flyback pulse, and for outputting an amplified triangular wave; and
   a Schmitt circuit for establishing a logic "high" level and a logic "low" level centering around a reference level according to the amplified triangular wave supplied from said amplifying circuit and for changing a duty cycle on the basis of the logic "high" and "low" levels and for outputting a rectangular wave having an altered duty cycle.

2. The circuit as defined in claim 1, said waveform amplifying ratio control signal outputted by said microcomputer comprising a triangular wave amplifying ratio control signal.

3. A duty cycle alteration circuit in a monitor, comprising:
   a microcomputer for outputting a waveform amplifying ratio control signal;
   a direct current level adjusting circuit for inputting said waveform amplifying ratio control signal according to a horizontal size adjusting signal supplied from said microcomputer and for converting said waveform amplifying ratio control signal into a direct current signal;
   an integrating circuit for inputting a flyback pulse generated within said monitor, said integrating circuit being charged and discharged in accordance with the supplied flyback pulse for generating a triangular wave;
   an amplifying circuit for amplifying said triangular wave, generated by said integrating circuit, in response to the direct current signal, output from said direct current level adjusting circuit, for outputting an amplified triangular wave; and
   a Schmitt circuit for establishing a logic "high" level and a logic "low" level centering around a reference level according to the amplified triangular wave supplied from said amplifying circuit and for changing a duty cycle on the basis of the logic "high" and "low" levels and for outputting a rectangular wave having an altered duty cycle.

4. The circuit as defined in claim 3, said intergrating circuit comprising a capacitor and a resistor in which the flyback pulse is changed into the triangular wave according to an RC time constant of the resistor and capacitor.

5. A horizontal duty cycle alteration circuit alteration circuit in a monitor, comprising:

a microcomputer for inputting a horizontal synchronous signal and a vertical synchronous signal to discriminate a video mode and for outputting a waveform amplifying ratio control signal according to a horizontal size adjusting signal, based upon the discriminated video signal;
   a duty cycle alteration circuit for inputting and amplifying said waveform amplifying ratio control signal according to the horizontal size adjusting signal outputted form said microcomputer and for outputting a rectangular wave having an altered duty cycle;
   a horizontal size drive circuit for inputting the rectangular wave outputted from said duty cycle alteration circuit and for fully amplifying the inputted rectangular wave;
   a regulation sensor for sensing a variation of a sawtooth current outputted from a horizontal output circuit and for outputting a sensed variation signal corresponding to the sensed variation of said sawtooth current;
   a horizontal regulation controller for inputting the sensed variation signal of said sawtooth current outputted from said regulation sensor and for inputting a horizontal drive signal outputted from a horizontal size drive circuit and for stabilizing an output waveform of said sawtooth current; and
   a horizontal regulation output circuit for inputting a horizontal size adjusting signal outputted from said horizontal regulation controller and for controlling an output of said horizontal output circuit.

6. The circuit as defined in claim 5, said duty cycle alteration circuit transforming a flyback pulse or the rectangular wave generated within said monitor into the triangular wave through an integrating circuit and inputting the transformed triangular wave from said integrating circuit to change a duty cycle thereof.

7. A duty cycle alteration circuit in a video display monitor, comprising:
   a microcomputer generating a pulse width modulation adjusting level signal;
   an amplifying circuit amplifying said pulse width modulation adjusting level signal generated by said microcomputer and outputting an amplified triangular wave; and
   a Schmitt circuit establishing a logic "high" level and a logic "low" level centering around a reference level according to the amplified triangular wave output from said amplifying circuit to change a duty cycle on the basis of the logic "high" and "low" levels for outputting a rectangular wave having an altered duty cycle.

8. The duty cycle alteration circuit as set forth in claim 7, wherein said microcomputer discriminates a video mode an polarity according to a video signal input thereto to output said pulse width modulation adjusting level signal according to a horizontal size adjusting signal.

* * * * *